May 13, 1930. E. W. GOESER 1,758,108
SLIP CONSTRUCTION
Filed May 14, 1928
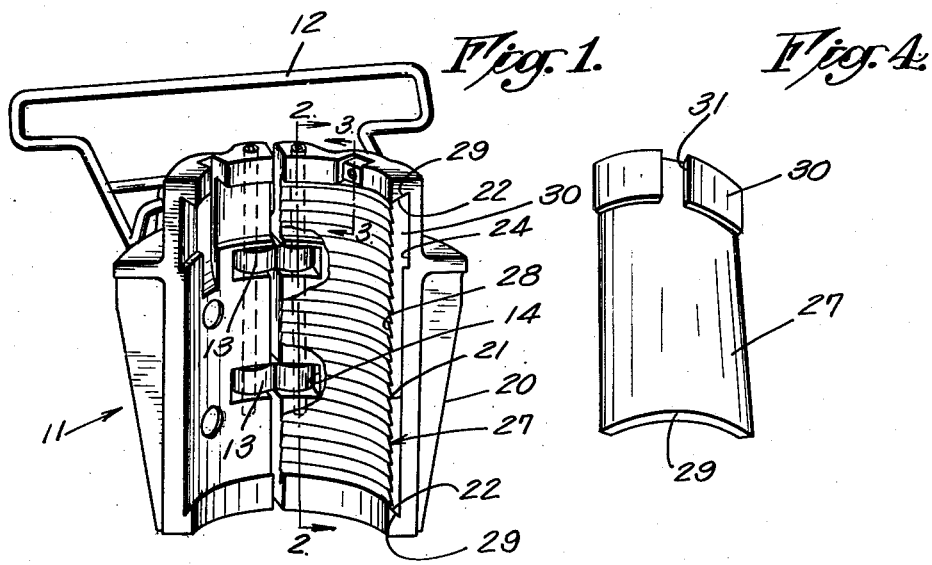
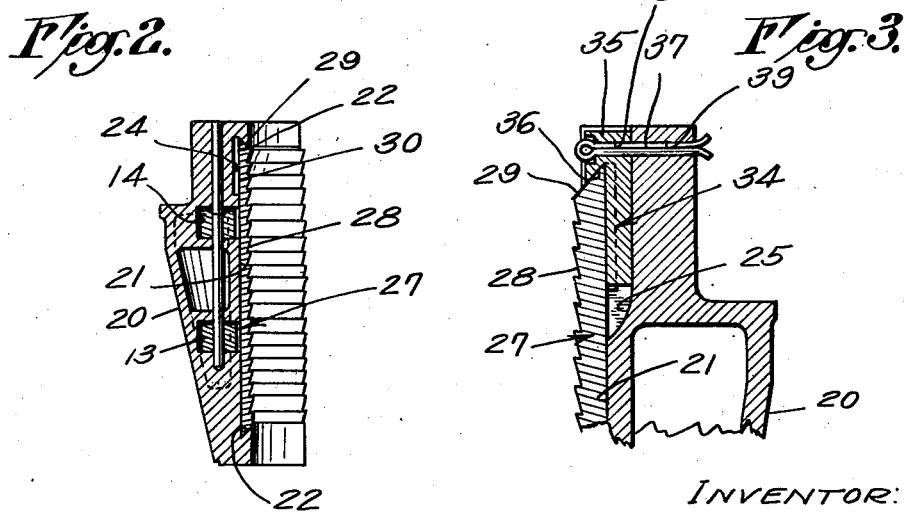
INVENTOR:
Edwin W. Goeser,
By
ATTORNEY.

Patented May 13, 1930

1,758,108

UNITED STATES PATENT OFFICE

EDWIN W. GOESER, OF LOS ANGELES, CALIFORNIA, ASSIGNOR TO EMSCO DERRICK & EQUIPMENT COMPANY, OF LOS ANGELES, CALIFORNIA, A CORPORATION OF CALIFORNIA

SLIP CONSTRUCTION

Application filed May 14, 1928. Serial No. 277,522.

My invention relates to oil well equipment and relates particularly to an improved slip construction.

In order that my invention may be understood, I will explain the utility thereof in the oil well industry. In this industry various pipes or casings are lowered into and removed from the well. For supporting a pipe or casing during the making and breaking of the joints, a slip construction is used. The ordinary form of slip construction includes a plurality of slips which are provided with frusto-conical exterior faces adapted to engage a similarly shaped seat, which seat is formed in a supporting body. The slips cooperate to form a cylindrical opening, the wall of which has horizontal teeth adapted to engage the pipe or casing. The weight of the pipe or casing on the slips forces them downward and the frusto-conical seat moves them inward so that the teeth grip the pipe or casing.

In view of the fact that the teeth on the slips are subject to wear, it is desirable to form the teeth on removable liners which may be replaced when necessary.

It is an object of this invention to provide a slip having a removable liner, and means for locking the liner in place, the locking means being designed so that it may readily be released to allow a removal of the liner.

A further object of the invention is to provide a slip having a body in which an arcuated under-cut channel is formed, an arcuate liner adapted to be extended into the channel through the side opening thereof, and removably disposed lock means for retaining the parts in their operative relation.

A still further object of the invention is to provide a slip in which the locking means for the liner is in the form of a key insertable from the top of the slip into a key-way and a key-slot formed respectively in the body and in the liner.

Further objects of the invention will be made manifest in the ensuing detailed description of the invention in which reference is made to the accompanying drawings.

In the accompanying drawings:

Fig. 1 is a perspective view showing one-half of a slip construction which embodies the essentials of the present invention.

Fig. 2 is a section taken on the line 2—2 of Fig. 1.

Fig. 3 is a section on an enlarged scale taken as indicated by the line 3—3 of Fig. 1.

Fig. 4 is a perspective view showing the back of a liner of this invention.

Referring in detail to the drawings, the slip construction is comprised of a plurality of slips indicated in general by the numeral 11. The slips are arranged in pairs, the pairs as shown in Fig. 1 being connected to a handle 12 by means of which they may be conveniently placed in the slip receiving opening of a supporting body. The pairs of slips are pivoted together by hinge members 13 which rest in recesses 14 provided in the adjacent faces of the pairs of slips. Extending vertically from the top of each slip and through the recesses 14, and through openings formed in the hinged members 13, are hinge pins 15 which hingedly connect the two slips together.

The invention does not reside in the construction which we have just described, but it resides in the novel means of locking a liner to the body of the slip. I will now describe one of the slips 11 in order that the invention may be understood.

The slip 11 has an outer frusto-conical face 20 adapted to engage a similar shaped internal seat in a supporting member. The inner face of the slip 11 is provided with an arcuated channel 21. The vertical sides of the channel 21 are open and the upper and lower parts thereof are defined by undercut edges 22. The vertical section of channel 21 is in the shape of a dove-tail channel. On a horizontal plane the channel 21 is open at its sides. The upper part of the channel 21 is provided with a deepened portion 24. As illustrated best in Fig. 3, a key-way 25 is formed from the top of the body 20 so that it extends vertically downward through the deepened portion 24 of the channel 21.

Adapted to rest in the channel 21 is an arcuated liner 27 provided with arcuated teeth 28 on its inner face, these arcuated teeth 28 extending horizontally. The upper and lower edges of the liner 27 are beveled, as indicated at 29, so that they conform to the contour of the undercut edges 22 of the channel 21. The liner 27 by this construction is prevented from being moved inwardly out of the channel 21. The upper end of the liner 27 is provided with a flange 30 which rests in the deepened portion 24 of the channel 21. The liner 27 is provided with a key-slot 31 which is formed vertically through the flange 30 thereof. When the liner 27 is in its proper position in its channel 21, the key-way 25 and the key-slot 31 are in alignment. The liner 27 is removed from the channel 21 through the side opening thereof.

In order to lock the liner 27 in the channel 21 I provide a lock in the form of a lock-key 34, which is adapted to be extended downward so that it rests and is removably disposed in the key-way 25 and the key-slot 31. The upper end of the lock-key 34 is provided with a head 35. The head 35 is provided with a lower beveled face 36 adapted to engage an adjacent portion of the upper beveled face 29 of the liner 27. In order to prevent the lock-key 34 from inadvertently being moved from locking position I provide a retainer in the form of a cotter-key 37 which is extended horizontally from openings 38 and 39 formed respectively in the head 35 and the upper part of the slip 11. In this manner the parts are retained in their operative relation.

In the construction of the invention just described, the upper and lower undercut faces of the channel 21 prevent the liner 27 from moving upward or downward or from moving inward in the channel 21. In view of the fact that the sides of the channel are completely open I have provided the lock means which restrains the liner 27 from moving sidewardly in the channel 21. The lock means is an important part of the invention. In view of its simplicity, and in view of the facility with which the lock-key 34 may be removed, it is a very simple operation to remove the liner 27 and to insert another liner to replace it.

I claim as my invention:

1. In a slip for gripping pipe, the combination of: a body having a frusto-conical outer face, an inner arcuated side-opening channel, and a key-way formed in said body adjacent said channel; an arcuated liner disposed in said channel and having teeth formed on the inner face thereof, and having a key-slot formed therein, said liner being adapted to be removed from said channel through said opening thereof; and a lock removably disposed in said key-way and key-slot for retaining the parts in their operative relation.

2. In a slip for gripping pipe, the combination of: a body having a frusto-conical outer face, an inner arcuated side-opening channel, said channel having upper and lower undercut edges, and a key-way formed in said body adjacent said channel; an arcuated liner disposed in said channel and provided with upper and lower beveled edges adapted to contact said upper and lower undercut edges, said liner having teeth formed on the inner face thereof, and having a key-slot formed therein, said liner being adapted to be removed from said channel through said opening thereof; and a lock removably disposed in said key-way and key-slot for retaining the parts in their operative relation.

3. In a slip for gripping pipe, the combination of: a body having a frusto-conical outer face, an inner arcuated side opening channel, a deepened portion at the upper end of said channel, and a key-way formed in said body and extended through said deepened portion; an arcuated liner disposed in said channel having teeth formed on the inner face thereof, a flange formed on the outer face thereof and movably received in said deepened portion, and a key-slot formed in said flange, said liner being adapted to be removed from said channel through said opening thereof; and a lock removably disposed in said key-way and key-slot for retaining the parts in their operative relation.

4. In a slip for gripping pipe, the combination of: a body having a frusto-conical outer face, an inner arcuated side opening channel, and a key-way formed in said body adjacent said channel, the upper and lower extremities of said channel being defined by undercut portions formed adjacent the ends of said body; an arcuated liner disposed in said channel and having teeth formed on the inner face thereof and having a key-slot formed therein, said liner having upper and lower beveled edges fitting into the said undercut portions of said channel and adapted to be removed from said channel through said opening thereof; and a lock removably disposed in said key-way and key-slot for retaining the parts in their operative relation.

In testimony whereof, I have hereunto set my hand at Los Angeles, California, this 1st day of May, 1928.

EDWIN W. GOESER.